United States Patent [19]

Mally et al.

[11] Patent Number: 4,832,970
[45] Date of Patent: May 23, 1989

[54] METHOD FOR ASSEMBLING STUFFED PROTEINACEOUS PATTIES

[75] Inventors: Timothy G. Mally, Oregon; John A. Jonovic, Fitchburg; Alvin Borsuk, Madison, all of Wis.

[73] Assignee: Oscar Mayer Foods Incorporated, Madison, Wis.

[21] Appl. No.: 112,804

[22] Filed: Oct. 23, 1987

Related U.S. Application Data

[62] Division of Ser. No. 829,582, Feb. 13, 1986, Pat. No. 4,716,821.

[51] Int. Cl.$^4$ ............... A23P 1/08; A23L 1/317; A22C 7/00
[52] U.S. Cl. ...................... 426/274; 426/89; 426/94; 426/513
[58] Field of Search ............. 426/92, 274, 89, 513

[56] References Cited

U.S. PATENT DOCUMENTS 2,673,156 3/1954 Minder ........................... 426/518
3,131,066 4/1964 Mitzelfelt ........................ 426/92
3,999,248 12/1976 Mauer et al. .................... 426/513
4,530,847 7/1985 Natori ............................. 426/274

Primary Examiner—Donald E. Czaja
Assistant Examiner—Mary S. Mims
Attorney, Agent, or Firm—Joseph T. Harcarik; D. J. Donovan

[57] ABSTRACT

A line is provided for assembling a product including proteinaceous patties having a filling therebetween. All components of the line are mechanically synchronized to maintain a consistent pitch throughout the assembling procedure. Included is a patty forming means that deposits proteinaceous patties such as ground meat patties onto a moving conveyor assembly to thereby define the desired pitch. Edible filling materials such as sauces, condiments and/or cheeses are deposited onto this patty at the given pitch. Another patty is deposited thereover while the product being formed continues to flow on the generally straight-line conveyor assembly. Thereafter, a knitting station impresses projections or pins through the outer periphery of the upper patty and into the lower patty such that, after removal of the pins by the device, the patties are knitted together, and the filling is encapsulated therewithin.

7 Claims, 3 Drawing Sheets

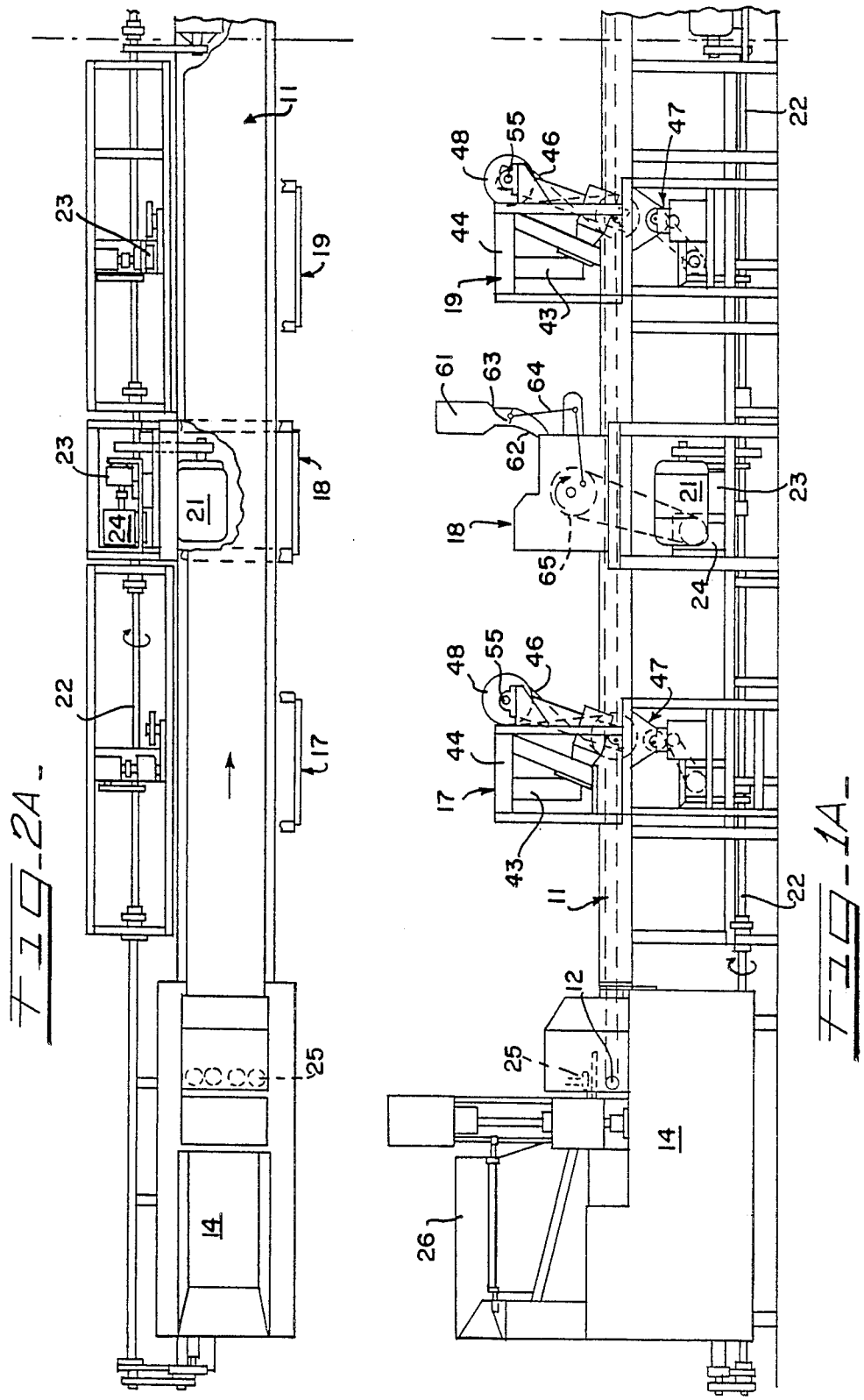

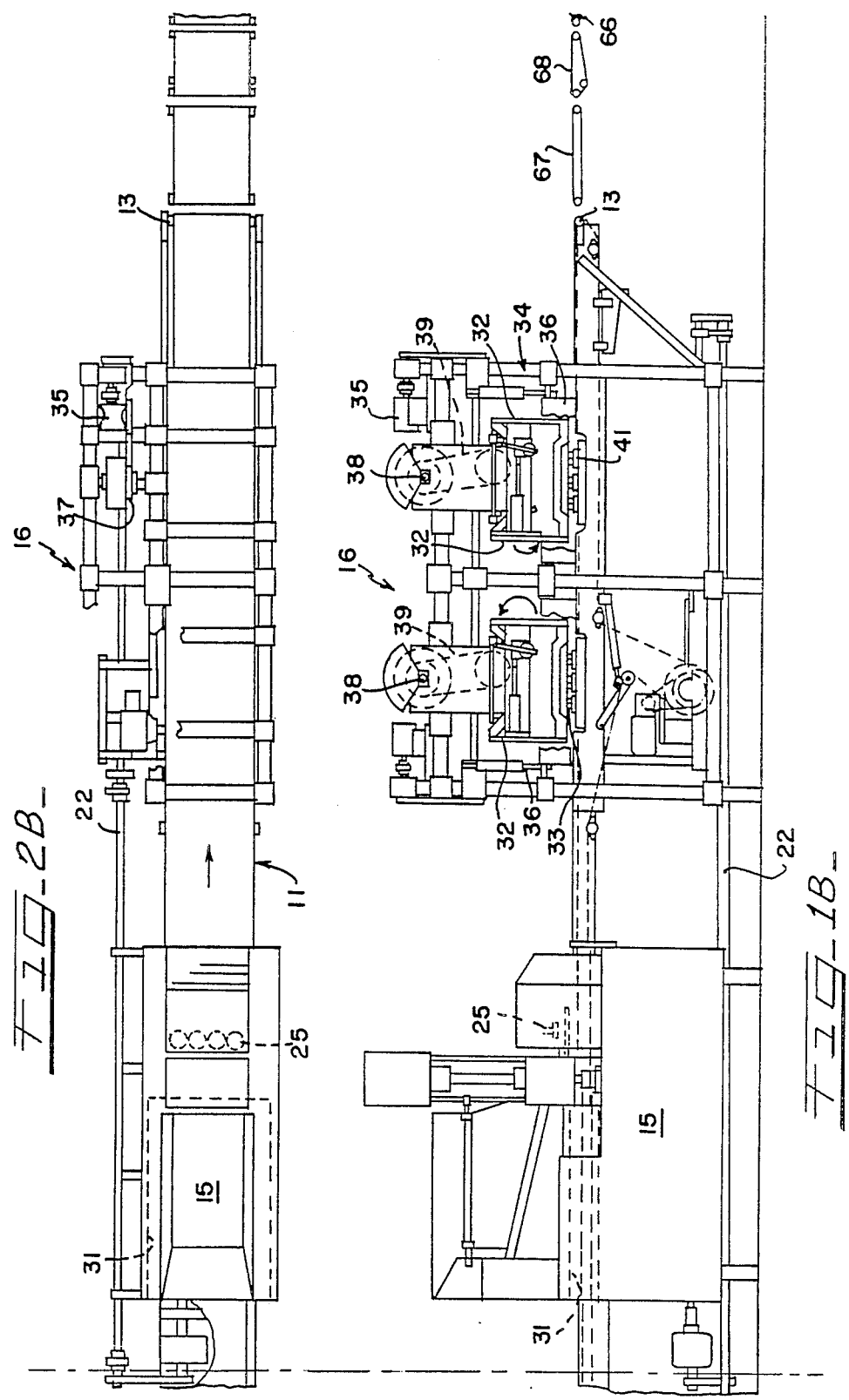

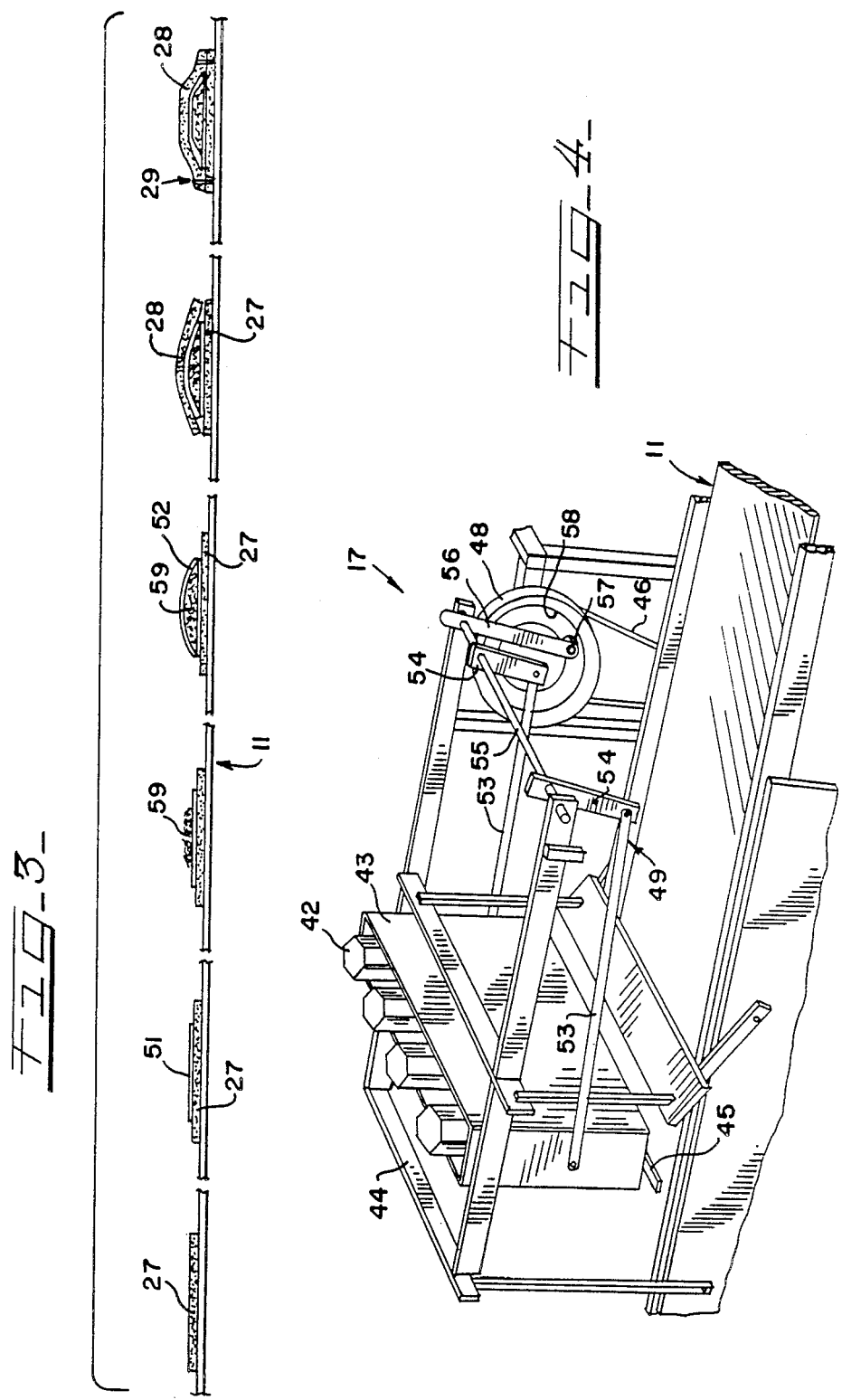

METHOD FOR ASSEMBLING STUFFED PROTEINACEOUS PATTIES

This is a division, of application Ser. No. 829,582, filed 2/13/86, now U.S. Pat. No. 4,716,821.

BACKGROUND AND DESCRIPTION OF THE INVENTION

The present invention generally relates to an apparatus and method for assembling a product including filling materials between at least two proteinaceous patties that are knitted together in order to form a stuffed proteinaceous patty product. More particularly, the invention relates to an assembly line including a plurality of stations positioned along a conveyor assembly, which stations supply a stream of first porteinaceous patties, deposit edible filling materials onto the first proteinaceous patties, deposit a second proteinaceous patty thereover, and knit the proteinaceous patties together with the filling therebetween. The line is especially suitable for assembling two meat patties with food material therebetween, such as cheeses and condiments including sauces, spices, bacon pieces, and vegetables that are chopped, chunked, flaked or otherwise processed or shaped, in order to form a product in the nature of a stuffed meat food item that is assembled from individually formed meat patties.

Previous attempts have been made to produce proteinaceous products that are filled with other food items such as cheeses or condiments. Generally speaking, such prior approaches do not knit together a plurality of patties in a manner in which the patties may have cheeses, condiments, or the like located therebetween. Rather than proceeding with a general approach that involves assembling components and knitting them together, such previous attempts at preparing stuffed proteinaceous patty products have been more in the nature of actually stuffing condiment materials into an opening within a meat item.

Contrary to this, the present invention includes the basic approach of building or assembling a product in a sandwich-like fashion wherein filling materials and a separate patty are positioned onto a bottom patty, after which the various components are knitted or crimped together. Copending, commonly assigned patent applications are directed to certain aspects of providing such an assembled product including knit-together patties. Included are patent application Ser. No. 705,762, filed Feb. 26, 1985, as well as applications entitled "Rotary Volumetric Piston Dispenser and Camming Assembly", "Pass-Through Proteinaceous Patty Making Apparatus" and "Automatic Crimping Mechanism for Proteinaceous Patties". Each of these applications is hereby incorporated by reference hereinto.

When filled and knitted proteinaceous patty products of this type are to be assembled and processed under high volume or industrial-type conditions, it is important to be able to accomplish the assembly steps on a continuous basis and in a manner in which the assembled product that is produced is of consistent quality and appearance. Another important consideration is the ability to provide an overall industrial-type line that has individual components which are readily accessible for maintenance needs and also for cleaning operations that are essential for industrial-scale food processing lines. Also important is the ability for such a line to readily handle large volumes of products, preferably on a continuous basis such that products in differing stages of assembly are simultaneously undergoing respective ones of various assembly procedures while the respective products or partially formed products are being conveyed.

Basic objectives of this type, as well as additional specific features and advantages, are achieved according to the present invention, which includes a plurality of operational stations that are spaced along a conveyor assembly, which operational stations perform desired respective functions, including depositing various food items onto the conveyor or a food item or layer that had been previously deposited onto the conveyor or onto another such food item or layer ultimately supported by the conveyor in order to thereby form a multi-layered food product on the conveyor. A further operational station is provided for attaching at least some of these layers to each other in order to form an assembled product having generally unitary characteristics.

It is accordingly a general object of the present invention to provide an improved apparatus and method for assembling stuffed proteinaceous patty products.

Another object of the present invention is to provide an improved apparatus and method associated with an industrial-scale food processing line whereby a multi-layered food product is assembled into a generally unitary product having external layers of meat and at least one internal filling layer of a cheese, condiment, vegetable or the like.

Another object of this invention is to provide an improved apparatus and method for continuously conveying a food product at various stages of the assembly thereof, with a plurality of stations performing desired operations on the product at various stages of its assembly and while same continues to be conveyed therealong.

Another object of this invention is to provide an improved apparatus and method including a plurality of stations and operations that are properly sequenced and timed to accurately accomplish depositing, assembling and knitting functions.

Another object of this invention is to provide an improved apparatus and method for depositing discrete volumes of materials onto desired locations along a moving conveyor and in accordance with a predetermined pattern.

Another object of this invention is provide an improved apparatus and method which includes the ability to cyclically impart knitting motion to a flow of multi-layered proteinaceous patty items in order to thereby knit such patty items together.

Another object of the present invention is to provide an improved apparatus and method which includes assembling a multi-layered proteinaceous product including proteinaceous patties having one or more cheese slices included in a filling therebetween.

Another object of this invention is to provide an impmroved apparatus and method for automatically assembling in an economically feasible manner a product that is difficult to manufacture manually.

These and other objects, features and advantages of this present invention will be clearly understood through a consideration of the following detailed description.

BRIEF DESCRIPTION OF THE DRAWINGS

In the course of this description, reference will be made to the attached drawings, wherein:

FIGS. 1A and 1B, as combined along the indicated center lines, provide a side elevational view of the preferred product assembly line according to this invention;

FIGS. 2A and 2B, as combined along the illustrated center lines, provide a top plan view, partially broken away, of the line illustrated in FIGS. 1A and 1B;

FIG. 3 is a detail view, partially broken away, of a portion of the conveyor assembly shown in FIGS. 1A and 1B and FIGS. 2A and 2B, with stages of assembly of the preferred product being illustrated thereon; and FIG. 4 is a detailed perspective view showing a cheese-slicing and depositing station that is illustrated in FIGS. 1A and 1B and FIGS. 2A and 2B, particularly the drive sub-assembly thereof.

DESCRIPTION OF THE PARTICULAR EMBODIMENTS

With particular reference to FIGS. 1A and 1B and FIGS. 2A and 2B, a conveyor assembly, generally designated as 11, provides a continuous conveyor run throughout substantially the entire length of the apparatus, the conveyed working path running from an upstream end roller 12 or the like through to a downstream end roller 13 or the like. Conveyor assembly 11 provides a conveyed pathway between an upstream proteinaceous patty providing device 14 for providing a stream of first or bottommost proteinaceous patties onto the conveyor assembly 11. Depositing filling material onto the stream of first or bottommost proteinaceous patties is carried out by one or more filling depositing assemblies located along the conveyor assembly 11 between the upstream end proteinaceous patty providing device 14 and a downstream proteinaceous patty providing device 15. Located along the conveyor assembly 11 and downstream of the downstream proteinaceous patty providing device 15 is a knitting or crimping assembly, generally designated as 16.

In the embodiment illustrated in the Figures, a plurality of individually stationed filling depositing assemblies are shown. Included in this regard is an upstream cheese slice supplying assembly, generally designated as 17, an assembly for providing a series of desired volumes of condiments, generally designated as 18, and a downstream cheese slice providing assembly, generally designated as 19. Preferably, each cheese slice providing assembly 17, 19 slices a supply of bulk cheese at a location such that each thus cut cheese slice falls, at completion of the cut, onto a proteinaceous patty moving with the conveyor assembly 11. Any of the cheese providing assemblies 17, 19 or the condiment assembly 18 can be omitted or taken out of operation depending upon the stuffing or filling desired for the product being formed on the line.

In order to assure mechanically synchronized operation of the various assemblies or stations, each such assembly is preferably driven from a single drive assembly. For example, as illustrated, this drive assembly can include a motor 21 which drives a common drive unit, such as the illustrated line shaft 22. Phasers 23 and reducers 24 may be included within the drive chain as necessary in order to achieve desired timing and sequencing in connection with particular stations.

Upstream proteinaceous patty forming device 14 can be a patty making device of known construction that is capable of supplying a desired pattern of proteinaceous patties onto the conveyor assembly 11 on a continuous-flow basis, preferably in a plurality of generally parallel lines of proteinaceous patties having a predetermined spacing therebetween. Suitable in this regard are commercially available patty making machines available from Formax, Inc. of Mokena, Ill. Devices of this type include a plurality of patty knockout assemblies 25, which push patties formed in the device 14 out of the device and onto the conveyor assembly 11. With these types of devices, ground meat or the like is deposited into a hopper 26 thereof, which ground meat or the like is formed into the proteinaceous patties which are ejected at the patty knockout assemblies 25 in order to supply the first or bottom proteinaceous patty layer 27 (FIG. 3).

Downstream proteinaceous patty forming device 15 is a pass-through proteinaceous patty making apparatus that provides the last or uppermost proteinaceous patty 28 (FIG. 3), which is preferably somewhat larger than the bottommost proteinaceous patty 27 in order to accommodate filling between the patties 27 and 28, thereby imparting a generally dome-shaped configuration to the completed product, generally designated as 29. The preferred downstream or pass-through patty forming device 15 includes a generally horizontal longitudinal opening 31 therethrough such that the conveyor assembly 11 traverses a path through this opening 31. The conveyor assembly 11 traverses a path substantially throughout the entire horizontal longitudinal extent of the pass-through assembly 15, including a location below the assembly which forms the proteinaceous patties 28.

Opening 31 preferably takes the form of a generally horizontally oriented tunnel assembly through the cabinet which houses components for driving the patty forming assembly of the device 15. Conveyor assembly 11 and the mechanism for operating each of the patty knockout assemblies 25 are timed with respect to each other such that each uppermost patty 28 drops over each bottommost patty 27 and in substantial alignment therewith.

Opening or tunnel assembly 31 includes a plurality of panels that form a box-like sleeve or drawer which is secured to the cabinetry of the device, preferably in a substantially water-tight manner so that the tunnel assembly can be thoroughly washed down during clean-up operations. Structure for driving the assemblies that form the patties and pass them to the patty knockout assemblies 25 must be structured and arranged so as to remain free and clear of the volume that is defined by and is internal of the opening or tunnel assembly 31. Further details of a preferred form of the pass-through proteinaceous patty providing device 15 are found in said copending and commonly owned patent application entitled "Pass-through Proteinaceous Patty Making Apparatus".

Knitting or crimping assembly 16 knits layers of proteinaceous patties together and is especially suitable for knitting the uppermost proteinaceous patty 28 to the bottommost proteinaceous patty 27. Assembly 16 includes one or more crimper assemblies 32 that include a plurality of projections 33 which enter the proteinaceous patties 27, 28 in order to thereby knit them together while they are being conveyed along a pathway passing generally under the crimper assembly 32. Knitting or crimping assembly 16 further includes a frame assembly, generally designated as 34. One or more crimper drive assemblies 35, which initiate desired movement of the crimper assemblies 32, are advantageously driven by belts or the like which are ultimately driven by the line shaft 22 or the like.

Dual crimper assemblies 32 are preferably provided so that one of the crimper assemblies 32 can be in a cleaning mode in association with a crimper wash assembly 36 while the other crimper assembly 32 is in a crimping mode. Crimper drive assembly 35 provides a substantially constant-speed drive input to a cam assembly 37 which in turn provides non-linear output to an output shaft 38 for driving each respective crimper assembly 32 through an output drive member such as the illustrated pulley and belt assembly 39. Assembly 39 rotates its crimper assembly 32 in a generally circular manner. Movement of each crimper head 32 is such that each moves at substantially the same speed as the conveyor assembly during the bottommost portion of the desired generally circular motion of crimper assembly 32. Additionally, each crimper head 41 moves through a plane substantially parallel to the plane of the belt of the conveyor assembly 11 at the downwardly directed, conveyor-engaging location of the respective crimper heads 41. In this manner, there is substantially no relative lateral movement between each crimper head 41 and the conveyor belt during the time that the crimping operations are being carried out. This substantially prevents smearing of the lowermost proteinaceous patty or layer 27 during the crimping operation, and it also assists in maintaining product orientation and integrity during the crimping operation. Further details of the preferred knitting or crimping assembly are found in said copending and commonly owned application entitled "Automatic Crimping Mechanism for Proteinaceous Patties".

Of the available filling material depositing assemblies, the cheese slice providing assemblies 17, 19 preferably have a structure as generally illustrated in FIG. 4. The assembly 17 is mounted over the conveyor assembly 11. Except for the feed drive mechanism, assembly 17 is of generally known construction, such being available commercially from J. E. Grote Pepp-A-Matic Co., Inc., of Columbus, Ohio. Included are a plurality of canisters 42 for receiving elongated cylinders of cheese or the like which are thus oriented in a vertical direction within a movable carrier 43. Movable carrier 43 is supported by frame assembly 44 in a manner such that the bottom of each canister 42 moves above, in closely spaced fashion, with respect to a slicer blade 45 of known construction. The cylinder of cheese projects slightly beyond the bottom of each canister 42 to the extent that the slicer blade 45 forms a cheese slice which then falls onto the conveyor assembly 11.

With more particular reference to the assembly for driving the movable carrier 43, such is directly driven, by cable drive 46, which is in turn driven by the line shaft 22 or the like by the operation of the drive assembly 47. The conveyor assembly 11 is driven at a substantially constant velocity by the line shaft 22, and the cable drive 46 and the drive assembly 47 drive a cam wheel 48 by virtue of movement of the line shaft 22, with the result that movement of the conveyor assembly 11 and of the cam wheel 48 is mechanically synchronized.

Cam wheel 48 in turn drives a linkage assembly, generally designated as 49, which transmits the motion of the cam wheel 48 to the movable carrier 43 such that the cheese slices 51, 52 (FIG. 3) are centrally deposited onto each of the patties 27, as illustrated in FIG. 3. More particularly, the cam wheel 48 driven by the line shaft 22 or the like, makes one revolution for each pitch of the flow of products or patties 27 by virtue of movement of the conveyor assembly 11. The linkage assembly 49 moves the cylinders of cheese across the slicer blade 45 with a velocity substantially equal to the velocity of the conveyor assembly 11 in order to thereby cut and place a slice of cheese or the like precisely onto, typically generally centrally located with respect to, each moving product or patty 27.

The linkage assembly 49 illustrated in FIG. 4 includes tie-rods 53, each of which is secured at one end to the movable carrier 43 and at its other end to a lever arm 54. Each lever arm 54 is secured to a rotatably mounted shaft 55. Also secured to the rotatably mounted shaft 55 is a linkage arm 56 that is in turn secured to a cam follower 57 which rides within cam track 58 of the cam wheel 48.

Another filling material depositing assembly that is preferably included on the line is the condiment assembly 18, which preferably takes the form of a rotary volumetric piston dispenser assembly which directs and deposits controlled volumes of flowable, particulate and/or chunk material in order to deposit desired volumes of the material in a predetermined pattern corresponding to the pitch of the product flow on the conveyor assembly 11. Assembly 18 deposits a condiment component 59 (FIG. 3) in a predetermined pattern onto a flow of bottommost patties 27 having a predetermined pitch therebetween. In the illustrated embodiment, the condiment volume 59 is deposited onto a cheese slice 51 which rests on each of the bottommost patties 27.

Assembly 18 which is illustrated includes a hopper 61 for storing the condiment material to be deposited through a suitable manifold 62. Movement out of the hopper 61 can be facilitated by including an internal agitator 63 which is operated through a suitable linkage arrangement 64 driven by the drive member 65, which is in turn driven by the motor 21 that powers the line shaft 22 or the like.

The preferred condiment assembly 18, which is described more fully in the copending application entitled "Rotary Volumetric Piston Dispenser and Camming Assembly," includes a camming assembly having a cam track that receives a cam follower which operatively engages and imparts generally radial movement to a member such as a piston that rotates within a rotary support assembly for the piston, typically a drum assembly. The condiment material is first positioned on the piston at a predetermined location along the periphery of the rotary support assembly. While on the rotary support assembly, this condiment material is fashioned as the desired filling material portion, and this portion of filling material is separated from the rotary support assembly and deposited in the desired pattern onto the moving conveyor assembly 11. Drive member 65 imparts the rotary movement needed to drive these components.

Condiment assembly 18 is structured so as to be able to receive and dispense materials of varying consistencies that may be in the nature of a wet material such as a sauce, a substantially dry material such as chopped bacon pieces, or consistencies therebetween, such as spices, cheeses, or vegetables that are chopped, cut, chunked, shredded or flaked. The materials may or may not be compressible, and they typically should exhibit some viscous properties. When necessary, the preferred condiment delivery assembly 18 can accomplish a compression of these materials, and it can also handle materials by pumping if necessary. Provision can also be made for automatically cleaning the various delivery passageways through which the condiment material passes in order to thereby facilitate cleaning operations that are essential to food handling equipment.

The completed products 29 that are assembled according to this invention have the uppermost patty 28 crimped to the lowermost patty 27. Preferably, the uppermost patty 28 is somewhat larger in order to accommodate the cheese slices 51, 52 and condiment material 59 while still permitting passage of crimping pins through the outer periphery of the uppermost patty 28 and into the outer periphery of the lowermost patty 27. Typically, the completed products 29 will be promptly frozen by standard freezing devices downstream of a transfer conveyor 66. Prior to such freezing, the completed product 29 tends to be somewhat susceptible to breakage. This property is further complicated by the fact that the bottommost patty 27 tends to stick to the conveyor belt surface of the conveyor assembly 11. Control of this sticking problem is facilitated by providing downstream roller 13 in the form of a tail pulley that is of an especially small diameter such that the completed product 29 is peeled from the conveyor assembly 11 by movement of the belt through a sharp angle, while the completed product 29 continues onto a receiving belt 67. A further belt 68, having chain-like properties can be provided as desired.

The conveyor assembly 11 and the various stations positioned therealong are combined to operate at an output rate of, for example, between about 30 and 75 strokes per minute. Each flow line of products on the conveyor assembly 11 accordingly has the ability to provide between 30 and 75 completed products 29 per minute. If, as generally illustrated, the apparatus is arranged to provide four generally parallel flow paths of products, this represents an exemplary production capacity of between about 120 and 300 completed products 29 per minute.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method for assembling a product including proteinaceous patties having a filling therebetween, comprising:

providing a generally horizontal conveyor assembly and driving same;

supplying a stream of first proteinaceous patties onto an upstream portion of the conveyor assembly during said conveyor assembly driving operation;

depositing edible filling materials onto respective ones of the first proteinaceous patties while same are conveyed by the conveyor assembly, said depositing taking place downstream of the supplying location for said stream of first proteinaceous patties, said depositing procedure forming a combined first patty and filling intermediate assembly;

flowing the conveyor assembly through a proteinaceous patty supplying means downstream of the depositing location in a pass-through operation that includes having the conveyor assembly traverse a path through a longitudinal opening of a pass-through proteinaceous patty supplying assembly, said step including positioning second proteinaceous patties onto respective ones of the combined first patty and filling intermediate assemblies while same are conveyed; and knitting together respective ones of said first patties and of said second patties while same are conveyed by the conveyor assembly at a location downstream of the pass-through patty supplying location.

2. The assembling method according to claim 1, wherein said step of supplying the first stream of proteinaceous patties supplies same according to a selected pitch between patties, said depositing of edible filling materials being in a stream of filling material volumes having said selected pitch, said pass-through patty supplying operation provides a stream of patties at said selected pitch, and said knitting operation engages said patties according to said selected pitch.

3. The assembling method according to claim 1, wherein said edible materials depositing operation includes providing cheese slices.

4. The assembling method according to claim 1, wherein said edible materials depositing operation includes providing a stream of spaced edible condiment volumes.

5. The assembling method according to claim 1, wherein said edible materials depositing operation include providing a stream of first cheese slices onto the stream of first proteinaceous patties, and providing a stream of spaced edible condiment volumes onto the stream of first cheese slices.

6. The assembling method according to claim 5, wherein said edible materials depositing operation further includes providing a spaced stream of second cheese slices onto the stream of spaced edible condiment volumes.

7. The assembling method according to claim 1, wherein said knitting step includes passing a plurality of projections through a peripheral portion of each of said second proteinaceous patties and into a peripheral portion of each of said first proteinaceous patties and then withdrawing the plurality of projections.

* * * * *